UNITED STATES PATENT OFFICE.

JAQUES EDWIN BRANDENBERGER, OF THAON-LES-VOSGES, FRANCE.

GOFFERED ARTICLE MADE FROM CELLULOSE FILMS.

982,467.  Specification of Letters Patent.   Patented Jan. 24, 1911.

No Drawing.   Application filed December 2, 1908. Serial No. 465,679.

*To all whom it may concern:*

Be it known that I, JAQUES EDWIN BRANDENBERGER, a Swiss citizen, and resident of Thaon-les-Vosges, France, have invented new and useful Improvements in Goffered Articles Made from Cellulose Films, which improvements are fully set forth in the following specification.

This invention relates to goffered articles and methods of making the same, and particularly to the production of goffered or embossed cellulose films obtained from aqueous solutions of cellulose.

Aqueous solutions of cellulose, such as xanthogenate or ammonio-cuprous solutions, are capable of regenerating this body in physical and chemical conditions such that the material affects the special form of a transparent or opaque film, either colored or not, and of a thickness varying between one-hundredth of a millimeter and two millimeters or more, according to the mechanical process employed. In this plastic form, the cellulose film lends itself to novel and numerous applications, as hereinafter described.

In accordance with this invention a cellulose film regenerated from a xanthogenate or ammonio-cuprous solution is goffered or embossed in any desired manner and the depressions filled up with a plastic or rigid reinforcing material. Compositions suitable for this purpose are preferably composed of mastic of a soft or firm consistency with a base such as resin, india-rubber, or gutta-percha, to which may be added linseed oil, oxidized if desired, or gelatin with or without glycerin. Loading agents may be added such as talc, kaolin, cork, vegetable or animal fibers, saw-dust or the like, and coloring matter if desired. The filling material may be powdered or pressed in the fiber by hand or by machine. The film thus treated is provided with a final support to which it is made to adhere by means of an adhesive. The following adhesives are suitable for either dry or moist films; dextrin, gum or glue either mixed with glycerin and in-solubilizing agents or not, alkaline silicate or aqueous solutions of viscose or the like.

The glues or adhesives that can be employed for the dry film only are alcohol, chloroform, ether, and carbid varnishes, such as mineral oil varnishes and resin varnishes, fat gummy varnishes, such as linseed oil varnish alone or combined with resins, solutions of cellulose in the ethers, alcohols, acetone, chloroform, such as collodion, solutions of celluloid, actetate of cellulose, etc. These various adhesives are employed in accordance with the nature of the supports and of the effects that it is desired to obtain. As supports particularly suited to this operation, paper, cardboard, fabrics of all kinds, leather, wood, metals in the form of sheets and all bodies presenting a continuous surface may be cited.

The supports may be either white or tinted, colored uniformly or provided with diversely colored designs, entirely or partially metallized with a view to obtaining special transparency effects.

A final support can be applied to the products obtained in this manner after the pouring of the mastic by using the mastic itself as the adhesive agent; it should be clearly understood that all the substances enumerated above are included under the term supports.

The film employed may be transparent, opaque, colored or colorless. On its front or back or upon both its faces the film may be painted, impressed by lithographic or typographic means, by means of engraved rollers, transfer processes or any other appropriate means in one or more colors.

When the cellulose is being regenerated, it may be loaded with bodies of all kinds such as talc, kaolin, mica, glass and generally speaking all minerals and vegetable substances in the form of powder, lamellæ, beads or in any other given form, which results in novel effects with a view to novel applications.

Instead of embossing the film, filling and applying it dry or moist to a support, as above described, the film may be applied to its support, embossed, then filled in the manner described, and then provided with a second support.

What I claim is:—

1. An article of the character described, consisting of a goffered cellulose film having the depressions of the goffering filled with a reinforcing material and a supporting surface for the film.

2. An article of the character described, consisting of a goffered cellulose film and backing, the depressions in the goffering being filled with a reinforcing material.

3. An article of the character described, consisting of a goffered cellulose film and backing, the depressions in the goffering being filled with a reinforcing material and a supporting surface.

4. An article of the character described, consisting of a goffered cellulose film and backing, the depressions in the goffering being filled with a plastic material which is normally hard.

5. An article of the character described, consisting of a goffered cellulose film and backing, the depressions in the goffering being filled with a plastic material which is normally hard, and a supporting surface.

In testimony whereof I have signed this specification in the presence of two subscribing witnesses.

JAQUES EDWIN BRANDENBERGER.

Witnesses:
EMILE LEDRET,
H. C. COXE.